Feb. 17, 1959
A. NIELSEN
2,873,758
VALVE FITTING FOR PUMP PRESSURE SYSTEMS
Filed Jan. 4, 1957
2 Sheets-Sheet 1
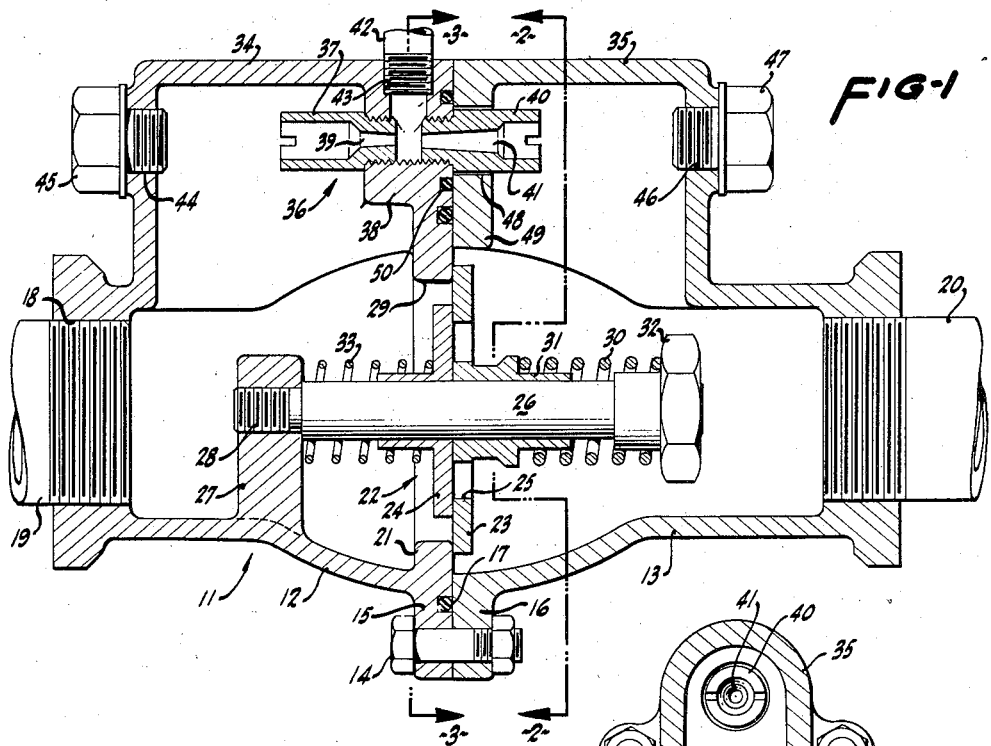
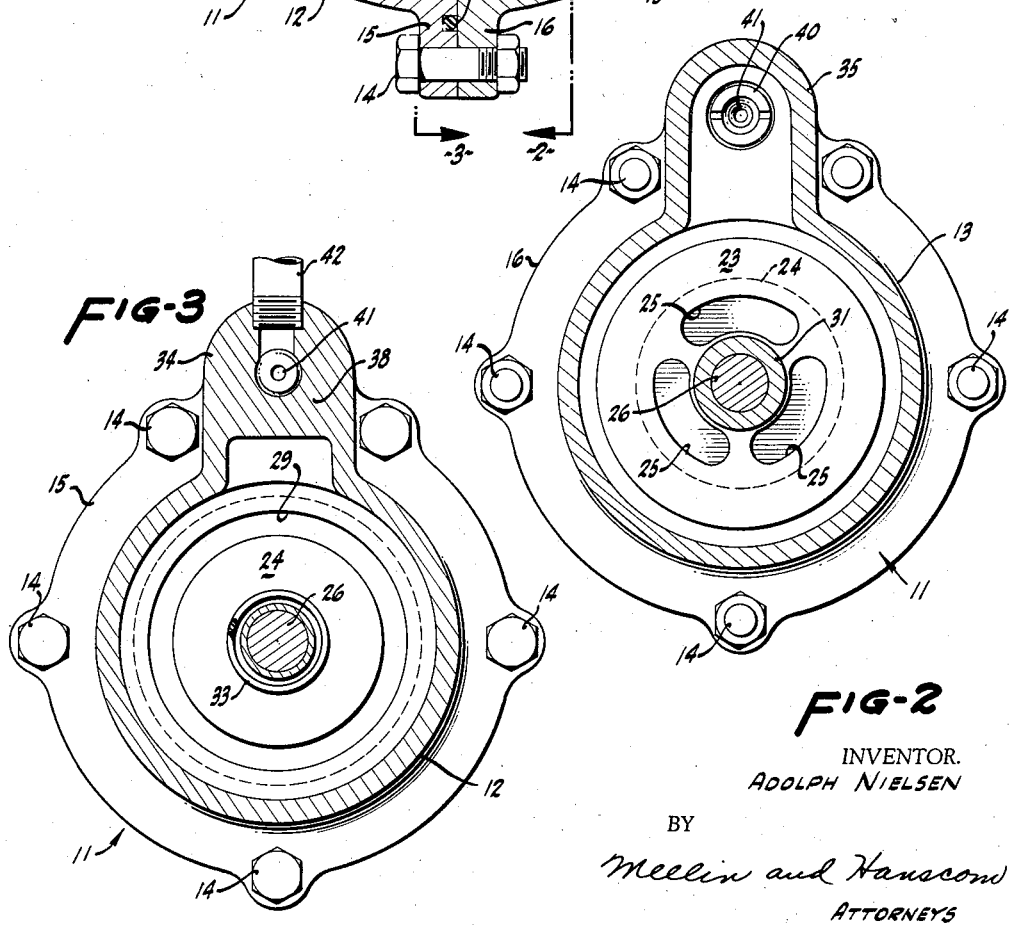
INVENTOR.
ADOLPH NIELSEN
BY
Meelin and Hanscom
ATTORNEYS Feb. 17, 1959 A. NIELSEN 2,873,758
VALVE FITTING FOR PUMP PRESSURE SYSTEMS
Filed Jan. 4, 1957 2 Sheets-Sheet 2

INVENTOR.
ADOLPH NIELSEN
BY
Mellin and Hanscom
ATTORNEYS

United States Patent Office 2,873,758
Patented Feb. 17, 1959

2,873,758

VALVE FITTING FOR PUMP PRESSURE SYSTEMS

Adolph Nielsen, Oakland, Calif.

Application January 4, 1957, Serial No. 632,435

1 Claim. (Cl. 137—209)

This invention relates to pump pressure systems, and particularly to a valve fitting operable to maintain a reserve supply of air at a substantially constant predetermined pressure.

It is among the objects of the present invention to provide an improved fitting for pump pressure systems adaptable for connection into such a system in a variety of ways.

Another object is to provide a fitting operable to maintain a water supply at a substantially constant pressure under widely varying loads.

A further object is to provide a fitting of the character described by which a substantially constant pressure may be maintained in systems having service connections connected to the system at various points.

It is also an object of this invention to provide a fitting of improved construction wherein air is taken into the system by a venturi operating in a by-pass radially spaced from the main flow passage of the fitting.

A still further object is to provide a fitting of the character described having a check valve of improved construction, operable to permit flow of water through the fitting in either direction in conformity with the requirements of varying conditions obtaining at different times in systems connected in various ways.

It is also an object of this invention to provide a fitting of improved construction, facilitating the construction and assembly of the various parts and obtaining increased efficiency in operation.

The invention has other objects and features of advantage, some of which, with the foregoing, will be explained in the following description of the simple form of the invention selected for illustration in the accompanying drawings which form a part of this specification. It is to be understood that the invention is not limited to the embodiment shown in the drawings, as it may be otherwise embodied within the scope of the appended claims.

In the drawings:

Fig. 1 is a longitudinal mid-sectional view of a fitting made in accordance with this invention, parts being shown in elevation.

Figs. 2 and 3 are transverse sectional views, the planes of the sections being indicated by the lines 2—2 and 3—3 of Fig. 1, respectively, as viewed in the direction indicated by the corresponding arrows.

Figure 6:
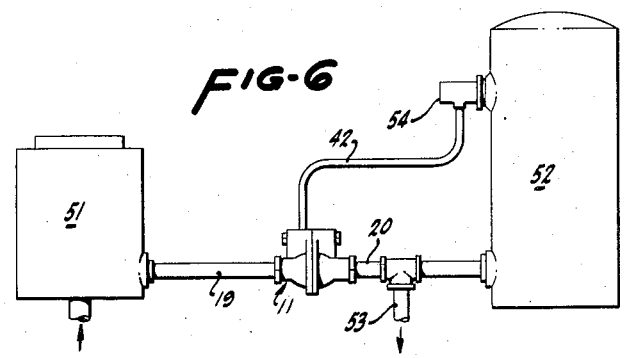
Figs. 6, 7 and 8 are diagrammatic views showing different arrangements in which the fitting of the present invention may be connected in a pump pressure system.

In terms of broad inclusion, the device of the present invention comprises a fitting arranged to be connected with the pump and the reserve pressure tank of a pump pressure system. The fitting comprises a body having a main flow passage and a by-pass radially spaced from the main flow passage and communicating between the ends of the flow passage. Within the by-pass is mounted a venturi operable to draw air into the fitting through a duct communicating with the by-pass at a point near the restricted area of the venturi. A double acting check valve is mounted within the body, about midway between its ends, for controlling the flow through the main passage, said check valve comprising an apertured plate, spring urged in one direction to engage a seat within the fitting, and a second plate spring urged in the opposite direction to seat against the apertured plate for covering the apertures therein. The fitting is connected between the pump and the pressure tank, with the service line connected either ahead of the fitting or between the fitting and the tank, or directly connected to the tank so that all of the service flow must pass through the tank. The venturi is arranged to draw air into the stream of water directed into the tank for maintaining an air cushion within the tank at a substantially constant predetermined pressure.

In terms of greater detail, and in particular reference to the embodiment illustrated in the drawings, the device of this invention comprises a body designated in general by the numeral 11. The body comprises two matching sections 12 and 13 secured in axial alinement by bolts 14 applied through flanges 15 and 16 upon the sections 12 and 13, respectively. The flanged ends of the sections are machined to seat together in sealing engagement when the bolts 14 are tightened. Preferably, an O-ring 17 is seated in one of the sections for engagement by the opposing section to insure a pressure-tight seat. The flanges 15 and 16 seat one upon the other, over the O-ring 17, about midway between the ends of the fittings; and the ends of the sections are tapered and provided with means 18 for coupling the fitting to supply and delivery lines 19 and 20. As illustrated, the ends are internally threaded and provided with flanges shaped for engagement by a wrench. Other coupling means may, of course, be substituted.

The section 12 is provided with an inwardly disposed flange 21 machined to form a seat for a check valve, designated in general by the numeral 22, for controlling the flow of water through the fitting. The check valve comprises an apertured valve plate 23 and an unapertured plate 24 arranged to seat against the plate 23 and cover apertures 25 formed therein. The valve plates 23 and 24 are slidably mounted upon a shaft 26 longitudinally disposed within the main flow passage between the ends of the fitting. Preferably, the shaft is supported by a lug 27, inwardly extending within the section 12, one end of the shaft 26 being threaded into the lug, as at 28, for supporting shaft in axial alinement with the ends of the fitting.

Figure 4:
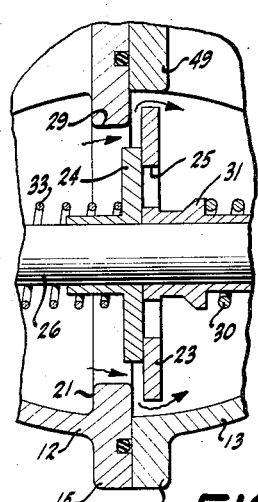
Figs. 4 and 5 are fragmental sectional detail views showing the check valve in different positions for operation under various conditions.
Figure 5:
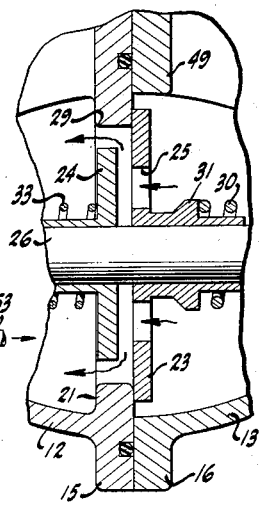

The valve plate 23 is urged to seat upon the flange 21, to cover the opening 29 therethrough, by a spring 30 mounted over the shaft 26. The end of the spring is seated upon a hub 31 carried by the plate 24, and the other end seats upon a nut 32 threaded onto the shaft. Another spring 33 is mounted between the lug 27 and the valve plate 24 for urging that plate into seating engagement with the apertured plate 23. Normally, the two plates combine to close the main flow passage, as indicated in Fig. 1 of the drawings. As the pressures on opposite sides of the check valve are unbalanced, the two plates may be moved together against the resistance of the spring 30 to permit flow from the intake to the delivery end of the fitting, as indicated in Fig. 4. When the pressure within the intake end of the fitting is less than the pressure in the delivery end of the fitting, the plate 24 is displaced against the resistance of the spring 33, as indicated in Fig. 5 of the drawings. Such displacement of the plate 24 uncovers the apertures 25, and permits flow in a reverse direction from the tank end to the supply end of the fitting.

The sections 12 and 13 are provided with matching radially extending portions 34 and 35, respectively, communicating with the main flow passages of the sections. A venturi, designated in general by the numeral 36, is mounted within the portions 34 and 35. As best shown in Fig. 1 of the drawings, the venturi comprises an intake section 37 threaded into a lug 38 at the inner end of the extension 34. A passage 39 is formed in the intake section 37, said passage tapering from the intake end to the delivery end. Threaded into the inner end of the section 37 is a delivery section 40 having a tapered passage 41. The small end of the passage 41 is spaced from the small end of the intake passage 39, preferably a distance approximately equal to the diameter of the venturi passages, at a point about midway along the lug 38. The lug 38 is bored and tapped, as at 43, to receive an air duct 42 communicating with the gap between the passages 39 and 41.

The venturi section 37 is screwed into its proper setting through an opening 44 formed in the end of the extension 34, and closed by a cap screw 45. A similar opening 46 is formed in the end of the extension 35, and is capped by a screw 47. The cap screws 45 and 47 are removable to give access to the venturi sections for cleaning, adjustment, or replacement after the fitting is installed without disconnecting the fitting from the supply and delivery lines to which it is coupled. The venturi section 40 extends into the fitting section 35 through an opening 48 formed in a flange portion 49 which seats against the face of the opposing section. An O-ring 50 is positioned around the opening 48 for engagement between the fitting sections to obtain a pressure-tight seal.

Figure 7:
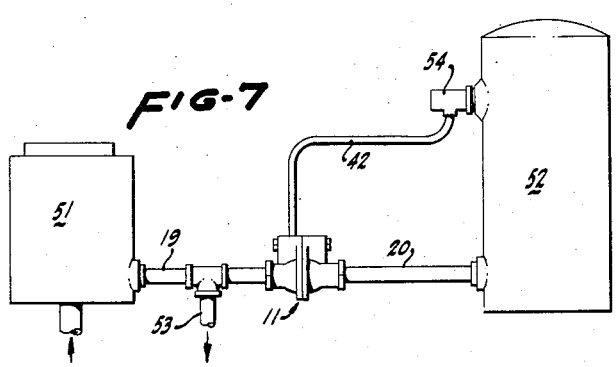
Figure 8:
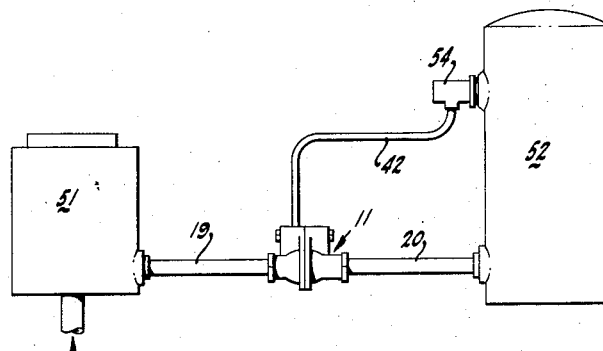

The fitting 11 may be connected to a pump 51 and to a pressure tank 52 by supply and delivery lines 19 and 20 coupled thereto in conventional manner, with the service line 53 connected into the system in any of several different ways. For example, Fig. 6 illustrates an arrangement wherein the service line 53 is connected into the delivery line 20 at a point between the fitting 11 and the tank. As illustrated in Fig. 7, the service line is connected into the supply line 19 between the pump and the fitting. In Fig. 8, the service line 53 is shown connected to the tank 52, so that the entire flow to the service line passes through the tank. The double acting check valve 22 obtains efficient operation in installations of any of these styles.

The air duct 42 may be connected to communicate with the tank at about the desired water level for maintaining an air cushion above the water, at a substantially constant predetermined level, in conventional manner. In such a system, air is drawn into the fitting by the venturi 36 from the tank, or from the outside atmosphere, through suitable check valve means 54, depending upon varying conditions prevailing while the pump is in operation to supply a flow to the tank and/or service line. Since the injection of air into the system is conventional, a detailed explanation of that operation is herein unnecessary.

The device of the present invention differs from the conventional practice in that the venturi 36, instead of being positioned axially within the main flow passage for water delivered therethrough, operates in the by-pass formed by the matching extensions 34 and 35. Thus, under ordinary operating conditions, only a part of the flow need pass through the venturi. The suction obtainable by the venturi, operating in the by-pass, is adequate to inject air into the system and to obtain the pressure differentials essential to maintaining a substantially constant pressure of predetermined degree in the tank.

In an installation such as shown in Fig. 6, the service line is supplied through the fitting 11, the check valve 22 being displaced, as shown in Fig. 4, to permit flow of water through the main passage. The valve is similarly displaced in installations such as shown in Fig. 8, where the supply line is connected directly to the tank. In installations such as shown in Fig. 7, the check valve sections may be displaced together as shown in Fig. 4 to permit flow from the pump to the tank, or the apertured plate may remain seated while the unapertured plate is displaced to permit flow from the tank to the supply line in a reverse direction. In any type of installation, the check valve mechanism operates in response to varying pressure conditions within the system to equalize and maintain an adequate substantially constant pressure under varying loads and conditions.

Having thus described my invention, what I claim and desire to secure by Letters Patent is:

A valve for constant pressure water supply systems in which a pump operates to direct water into a reserve supply tank under an air cushion automatically maintained therein at a predetermined pressure, comprising: a valve body having a main flow passage therethrough, said flow passage and its inlet and outlet being in axial alignment, a by-pass passage within said valve body spaced from the main flow passage and communicating between opposite ends thereof, a venturi removably mounted within said bypass with the axis of said venturi being spaced from the axis of said main passage, an opening through said valve body from the exterior thereof into said by-pass passage, said opening being of larger diameter than said venturi and said opening and said venturi being in axial alignment whereby said venturi may be removed from said valve body through said opening for servicing, removable means normally closing said opening, an air duct communicating with said by-pass passage adjacent the restricted area of said venturi, a check valve supporting shaft mounted in said main passage coaxially therewith, a valve seat formed in said main passage, an apertured plate mounted on said shaft and spring urged to seat upon said valve seat, and a closure plate mounted in said shaft and spring urged to seat upon the apertured plate for closing the apertures thereof, said closure plate being movable with said apertured plate in one direction and away therefrom in the opposite direction.

References Cited in the file of this patent
UNITED STATES PATENTS

| | | |
|---|---|---|
| 1,956,010 | Diescher | Apr. 24, 1934 |
| 2,388,755 | McLeod | Nov. 13, 1945 |
| 2,621,596 | Jacuzzi | Dec. 16, 1952 |